(12) United States Patent
Shuai et al.

(10) Patent No.: US 12,147,640 B2
(45) Date of Patent: Nov. 19, 2024

(54) ELECTROMAGNETIC TOUCH SCREEN AND ELECTROMAGNETIC TOUCH DEVICE

(71) Applicant: WUHAN CHINA STAR OPTOELECTRONICS TECHNOLOGY CO., LTD., Wuhan (CN)

(72) Inventors: Chuan Shuai, Wuhan (CN); Rui He, Wuhan (CN); Guowei Zha, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 7 days.

(21) Appl. No.: 18/082,010

(22) Filed: Dec. 15, 2022

(65) Prior Publication Data
US 2024/0126398 A1     Apr. 18, 2024

(30) Foreign Application Priority Data

Oct. 14, 2022 (CN) .......................... 202211262673.5

(51) Int. Cl.
  *G06F 3/046* (2006.01)
  *G06F 3/0354* (2013.01)
  *G06F 3/041* (2006.01)

(52) U.S. Cl.
  CPC .......... *G06F 3/046* (2013.01); *G06F 3/03545* (2013.01); *G06F 3/0412* (2013.01)

(58) Field of Classification Search
  CPC ..... G06F 3/046; G06F 3/03545; G06F 3/0412
  See application file for complete search history.

(56) References Cited

U.S. PATENT DOCUMENTS

| 5,434,372 A | * | 7/1995 | Lin | G06F 3/046 178/18.07 |
| 7,675,507 B2 | * | 3/2010 | Oda | G06F 3/046 345/173 |
| 2005/0104865 A1 | * | 5/2005 | Oda | G06F 3/046 345/173 |

* cited by examiner

*Primary Examiner* — Peter D McLoone
(74) *Attorney, Agent, or Firm* — PV IP PC; Wei Te Chung

(57) ABSTRACT

An electromagnetic touch device and an electromagnetic touch screen are provided. The electromagnetic touch device includes the electromagnetic touch screen. The electromagnetic touch screen is coupled with a stylus. The electromagnetic touch screen includes transmitting coils and receiving coils. The transmitting coils are correspondingly arranged in a peripheral area around the receiving coils. During interaction between the stylus and the electromagnetic touch screen, the transmitting coils transmit transmitting signals to generate a first magnetic field through which the stylus is charged. When a touch operation is performed, the receiving coils generate receiving signals according to a second magnetic field generated by the stylus, a touch point of the stylus is obtained according to the receiving signals.

20 Claims, 12 Drawing Sheets

ELECTROMAGNETIC TOUCH SCREEN AND ELECTROMAGNETIC TOUCH DEVICE

CROSS REFERENCE TO RELATED APPLICATION SECTION

This application claims priority to China Patent Application SN 202211262673.5 filed on Oct. 14, 2022, the entire contents of which are hereby incorporated by reference in their entirety.

TECHNICAL FIELD

The present disclosure relates to the field of touch technologies of display panels, and particularly to an electromagnetic touch screen and an electromagnetic touch device.

BACKGROUND

With development of communication technologies, electronic devices such as smart cell phones are becoming more and more popular. In the field of small and medium-sized displays, integration technologies become the current key research and development direction, that is, how to implement panels through the development of correlating technologies. Integration can ensure that a thickness of the display panel does not increase under the premise of ensuring that functions are not lost. The integration technologies of the display panels prepared in prior art can bring many derivative additional functions to the display panels, so that the display panels gradually transition from simple display interfaces to comprehensive perception and interaction interfaces.

Most of mainstream interactive stylus technologies in the prior art are based on capacitive touch. For example, according to the stylus technologies, cost is low, but capacitive touch requires a large difference in charge, resulting in problems such as a larger pen tip, poor writing experience, high time delay, and low precision, which in turn limit further development of the styluses in the professional field, and is disadvantageous to further improvement of touch experience. With the development of touch technologies, passive electromagnetic styluses are generally used to replace conventional capacitive touch styluses and touch screens. However, due to the complexity of the driving circuits in the electromagnetic styluses and electromagnetic touch screens prepared in the prior art, each coil needs to transmit and receive signals for each drive, which results in a longer overall time for one reporting point, especially in integrated design, a relatively impedance is higher, a required charging time is long, which in turn leads to poor touch effect of the electromagnetic styluses when touching, and problems of unsatisfactory touch reporting accuracy on the screens.

In summary, during use of the electromagnetic styluses prepared in the prior art, touch operations and the problems of unsatisfactory touch reporting accuracy are disadvantageous to further improvement of touch performance of the display panels.

SUMMARY

An electromagnetic touch screen and an electromagnetic touch device are provided in the embodiments of the present disclosure, so as to effectively relieve technical problems of unsatisfactory touch operation and unsatisfactory touch reporting accuracy when the electromagnetic stylus performs a touch operation.

In order to solve the above technical problems, in a first aspect, the present disclosure provides an electromagnetic touch screen, which including a base, transmitting coils and receiving coils, the transmitting coils and the receiving coils are arranged on the base, the transmitting coils are correspondingly arranged in a peripheral area around the receiving coils, the transmitting coils are configured to transmit transmitting signals, and the receiving coils are configured to generate receiving signals.

According to an embodiment of the present disclosure, the electromagnetic touch screen includes a display area and a non-display area disposed on at least one side of the display area, the transmitting coils and the receiving coils are at least correspondingly disposed in the display area, a number of turns of the transmitting coils is less than a number of turns of the receiving coils.

According to an embodiment of the present disclosure, the number of the turns of the transmitting coils is greater than or equal to 1 and less than 4.

According to an embodiment of the present disclosure, a distance between two adjacent turns of the transmitting coils ranges from 1 mm to 10 mm, and a distance between two adjacent turns of the receiving coils ranges from 1 mm to 10 mm.

According to an embodiment of the present disclosure, a width of each of the transmitting coils is greater than a width of each of the receiving coils.

According to an embodiment of the present disclosure, a ratio of the width of each of the transmitting coils to the width of each of the receiving coils ranges from 5 to 20.

According to an embodiment of the present disclosure, the receiving coils include first receiving coils and second receiving coils; the first receiving coils and the second receiving coils are disposed in different planes, and an orthographic projection of the first receiving coils on the base and an orthographic projection of the second receiving coils on the base are perpendicular to each other.

According to an embodiment of the present disclosure, the first receiving coils and the transmitting coils are disposed on a same layer.

According to an embodiment of the present disclosure, the electromagnetic touch screen further includes a control chip, the control chip is disposed on the base, both ends of each of the transmitting coils are electrically connected to the control chip, and both ends of each of the receiving coils are electrically connected to the control chip; and the control chip is configured to provide drive signals to the transmitting coils and provide receiving control signals, so as to drive the transmitting coils to transmit the transmitting signals and drive the receiving coils to generate the receiving signals.

According to an embodiment of the present disclosure, the electromagnetic touch screen includes a transmitting stage and a receiving identifying stage; during time diagrams corresponding to the transmitting stage and the receiving identifying stage, the control chip is configured to provide sequential drive signals or periodic drive signals to the transmitting coils, and the transmitting coil is configured to transmit the transmitting signals to generate a first magnetic field through which the stylus is charged; and during a timing diagram corresponding to the receiving identifying stage, the stylus is configured to discharge and generate a second magnetic field, the receiving coils are configured to be scanned line by line and generate the receiving signals according to the second magnetic field, and the control chip is configured to determine a touch point of the stylus according to the receiving signals.

In a second aspect, an electromagnetic touch device is provided. The electromagnetic touch device includes an electromagnetic touch screen coupled with a stylus, the electromagnetic touch screen includes transmitting coils and receiving coils, the transmitting coils are correspondingly arranged in a peripheral area around the receiving coils, the transmitting coils are configured to transmit transmitting signals, and the receiving coils are configured to generate receiving signals.

According to an embodiment of the present disclosure, the electromagnetic touch device further includes a control unit, the control unit is configured to receive a touch signal fed by the stylus and provide drive signals to the transmitting coils and the receiving coils according to the touch signal.

According to an embodiment of the present disclosure, the electromagnetic touch device further includes a transmitting unit and a receiving unit; the transmitting unit is connected with the control unit, configured to receive the drive signals from the control unit, and configured to transmit the drive signals to the electromagnetic touch screen; the receiving unit is connected with the electromagnetic touch screen, configured to receive the receiving signals from the receiving coils, and configured to transmit the receiving signals to the control unit; and the control unit is configured to determine a touch point of the stylus according to the receiving signals.

According to an embodiment of the present disclosure, the control unit further includes: a selecting circuit, electrically connected to the receiving unit, and configured to receive the receiving signals transmitted by the receiving unit; a detector circuit, connected to the selecting circuit, and configured to detect the receiving signals transmitted by the selecting circuit; a filter circuit, connected to the detector circuit, and configured to filter the receiving signals after detection and generate available induction signals; and a control circuit, connected to the filter circuit, and configured to receive the available induction signals and obtain the touch point of the stylus according to the available sensing signals.

According to an embodiment of the present disclosure, a number of turns of the transmitting coils is less than a number of turns of the receiving coils.

According to an embodiment of the present disclosure, a width of each of the transmitting coils is greater than a width of each of the receiving coils.

According to an embodiment of the present disclosure, a ratio of the width of each of the transmitting coils to the width of each of the receiving coils ranges from 5 to 20.

According to an embodiment of the present disclosure, the electromagnetic touch screen further includes a base, the transmitting coils and the receiving coils arranged on the base, the receiving coils include first receiving coils and second receiving coils, the first receiving coils and the second receiving coils are disposed in different planes, and an orthographic projection of the first receiving coils on the base and an orthographic projection of the second receiving coils on the base are perpendicular to each other.

According to an embodiment of the present disclosure, the first receiving coils and the transmitting coils are disposed on a same layer.

According to an embodiment of the present disclosure, the receiving unit includes a first receiving circuit and a second receiving circuit, the first receiving circuit is correspondingly and electrically connected to the first receiving coils, and the second receiving circuit is correspondingly and electrically connected to the second receiving coils.

Beneficial effects according to the embodiments of the present disclosure:

The electromagnetic touch screen and the electromagnetic touch device are provided in the embodiments of the present disclosure. The electromagnetic touch screen includes a base, transmitting coils, and receiving coils. During the interaction between the electromagnetic stylus and the electromagnetic touch screen, the transmitting coils generate transmitting signals and generate a corresponding electric field and a corresponding magnetic field. Charging is carried out under an action of the electric field and the magnetic field. When touching, the receiving coils generate receiving signals according to an electric field and a magnetic field generated by the stylus, and a touch point of the stylus is judged according to the above receiving signals. The transmitting coils and receiving coils are provided in the embodiments of the present disclosure, so that the transmitted signals and the receiving signals are formed through different coils, thereby effectively improving touch accuracy and performance of the electromagnetic stylus.

DESCRIPTION OF DRAWINGS

In order to more clearly illustrate technology solutions in the embodiments or in prior art, the accompanying drawings required for use in the description of the embodiments or prior art will be briefly described below. It will be apparent that the accompanying drawings in the following description are merely some of the embodiments of the application, and other drawings may be obtained from these drawings without creative effort by those of ordinary skills in the art.

DETAILED DESCRIPTION OF EMBODIMENTS

Figure 1A:
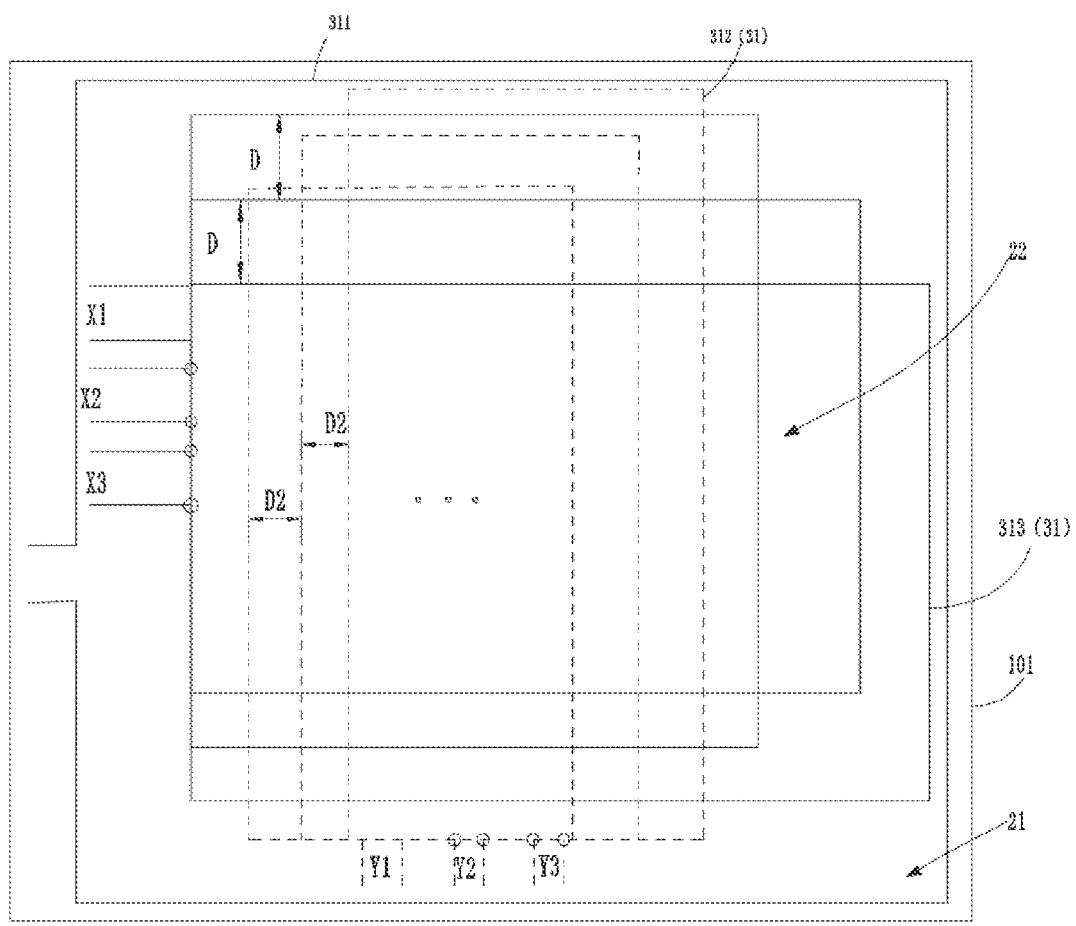
FIG. 1A is a schematic plane structural view of an electromagnetic touch screen provided in an embodiment of the present disclosure.

The following will be combined with the accompanying drawings in the embodiments of the present disclosure, and the following disclosure provides different implementations or examples to implement different structures of the application. To simplify the present disclosure, the components and arrangements of specific examples are described below. In addition, the present disclosure provides examples of various specific processes and materials, and those of ordinary skill in the art will recognize the application of other processes. All other embodiments obtained by those skilled in the art without the inventive step labor fall within the protection scope of the present disclosure.

In describing the present disclosure, it should be understood that orientation and positional relationships indicated by the terms "center", "longitudinal", "transverse", "length", "width", "thickness", "upper", "lower", "front", "back", "left", "right", "vertical", "horizontal", "top", "bottom", "inner", "outer", "clockwise", "counterclockwise", etc. are based on the orientation or positional relationship shown in the drawings, which is only for the convenience of describing the present disclosure and simplifying the description, rather than indication or implies that the device or component must have a specific orientation to a specific orientation configuration and operation, and therefore should not be construed as limiting the present disclosure. In addition, the terms "first" and "second" are only used for descriptive purposes and cannot be understood as indicating or implying relative importance or implicitly indicating the number of indicated technical features.

With continuous development of manufacturing technologies of display panels, higher requirements on the performance and display effect of display panels and display devices are put forward.

For a touch display panel, a stylus is generally coupled, and the stylus is configured to improve touch experience. However, when the stylus is applied to touch the touch display panel, a touch effect and a touch reporting accuracy are not ideal in the prior art, and best touch experience cannot be achieved.

An electromagnetic touch screen and an electromagnetic touch device are provided in embodiments of the present disclosure, so as to effectively improve the touch reporting accuracy and the touch effect of the electromagnetic touch screen during touch operations.

As shown in FIG. 1A, FIG. 1A is a schematic plane structural view of the electromagnetic touch screen provided in the embodiment of the present disclosure. In the embodiment, the electromagnetic touch screen includes a display area 22 and a non-display area 21. The display area 22 may be arranged on at least one side of the non-display area 21. In following embodiments, the non-display area 21 may be arranged around the display area 22, such as that the non-display area 21 is arranged at an edge area of the electromagnetic touch screen.

In addition, the electromagnetic touch screen further includes a base 101 and a plurality of coils. Specifically, the coils include transmitting coils 311 and receiving coils 31. The transmitting coils 311 and the receiving coils 31 can be correspondingly arranged on a sensing layer. When setting, all of the transmitting coils 311 and the receiving coils 31 can be arranged on the base 101, and the transmitting coils 311 and the receiving coils 31 can be arranged in different planes. Specifically, the receiving coils 31 are correspondingly arranged on the transmitting coils 311. At this time, the transmitting coils 311 and the receiving coils 31 may be located on different film layers. In addition, when setting, the transmitting coils 311 and the receiving coils 31 may be arranged on a same film layer, and the transmitting coils 311 surround the receiving coils 31.

The transmitting coils 311 and the receiving coils 31 may be configured as electromagnetic coils provided with multiple turns in the embodiment of the present disclosure. Multiple turns of the electromagnetic coils may be arranged at equal intervals. For example, the transmitting coils 311 are arranged at equal intervals on an induction layer. At the same time, the electromagnetic coils are arranged at least in the display area 22. In the following embodiments, that the electromagnetic coils are arranged in the display area 22 and the non-display area 21 is taken as an example for illustration.

In addition, when setting the electromagnetic coils corresponding to the receiving coils 31, the receiving coils 31 may be configured as a plurality of receiving coils in different planes. Specifically, in the following embodiments, the receiving coils 31 are described by taking an example that the receiving coils 31 include first receiving coils 312 and second receiving coils 313. Specifically, the first receiving coils 312 and the second receiving coils 313 may be arranged in different planes, or may be arranged on a same film layer according to actual conditions. That the first receiving coils 312 and the second receiving coils 313 are arranged in different planes is taken as an example, via structures may be provided at a beginning portion and an end portion of each coil to electrically connect with components in the other film layers.

At the same time, in the plane corresponding to the first receiving coils 312, the first receiving coils 312 are provided with multiple turns. In the plane corresponding to the second receiving coils 313, the second receiving coils 313 are also provided with multiple turns. In this way, in a horizontal plane corresponding to the base 101, the first receiving coils 312 are equivalent to the electromagnetic coils arranged in a horizontal direction, and the second receiving coils 313 are equivalent to the electromagnetic coils arranged in a Y direction.

In addition, the electromagnetic touch screen further includes the transmitting coils 311. In the embodiment of the present disclosure, the transmitting coils 311 are correspondingly arranged in a surrounding peripheral area of the receiving coils 31 when setting the electromagnetic coils corresponding to the transmitting coils 311, such as that the transmitting coils 311 surround the receiving coils 31.

In the embodiment of the present disclosure, the transmitting coils 311 are also provided with multiple turns. Only one turn of the transmitting coils 311 is shown in FIG. 1A. At the same time, a number of the transmitting coils 311 is less than a number of the receiving coils 312. Preferably, the number of the transmitting coils is greater than or equal to 1 and less than 4. Specifically, in the following embodiments, that one turn of the transmitting coils 311 is shown is taken as an example.

When the electromagnetic touch screen works and a stylus is operated to touch the electromagnetic touch screen, the above-mentioned electromagnetic coils will generate induced electric fields and induced magnetic fields under actions of electric signals, and the induced electric fields or the induced magnetic fields will charge the stylus. When the stylus touches the screen, the stylus feeds a touch signal to the electromagnetic touch screen through the electromagnetic coils, so as to eventually implement the touch of the screen, and obtain the touch point of the stylus.

Specifically, when the above-mentioned electromagnetic coils are arranged, the electromagnetic coils may be arranged in a passivation layer. Other film structures are subsequently arranged on the passivation layer. Preferably, the electromagnetic coils may be directly tiled in the passivation layer, thereby forming an electromagnetic sensing layer, and then acting on the external stylus.

Figure 1B:
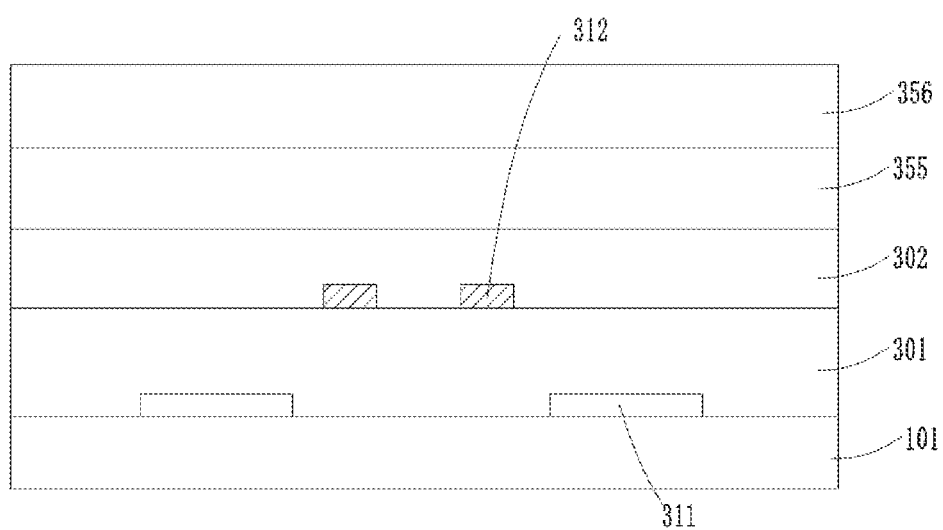
FIG. 1B is a schematic structural view of film layers of the electromagnetic touch screen provided in the embodiment of the present disclosure.

Specifically, as shown in FIG. 1B, FIG. 1B is a schematic structural view of film layers of the electromagnetic touch screen provided in the embodiment of the present disclosure. Combining with the schematic plan diagram shown in FIG. 1A, in the embodiment of the present disclosure, the electromagnetic touch screen includes the base 101 and a sensing layer disposed on the base 101. Specifically, the sensing layer may be configured as a multi-layer structure. In the following embodiments, that the sensing layer includes a first sensing layer 301 and a second sensing layer 302 is taken as an example to describe the sensing layer. In addition, the sensing layer may be set as other numbers of sensing layers, which are set according to actual product requirements, and will not be repeated here.

Preferably, the first sensing layer 301 is disposed on the base 101, and the second sensing layer 302 is disposed on the first sensing layer 301. At the same time, a light-emitting component layer 355 is further disposed on the second sensing layer 302, and a protective layer 356 is further disposed on the light-emitting component layer 355.

Specifically, the transmitting coils 311 are arranged in the first sensing layer 301, and the first receiving coils 312 are arranged in the second sensing layer 302. Specifically, the transmitting coils 311 may be arranged on a side of the first sensing layer 301 facing the base 101, and the first receiving coils 312 may be arranged on a side of the second sensing layer 302 adjacent to the transmitting coils 311.

In the embodiment of the present disclosure, the second receiving coils may be arranged in other film layers 313. When setting, the relationship between the second receiving coils 313 and the transmitting coils 311 may be defined according to FIG. 1, or be arranged with reference to an arrangement of the first receiving coils 312, which will not be repeated here. Specifically, an orthographic projection of the first receiving coil 312 and an orthographic projection of the second receiving coil 313 are perpendicular to each other. For example, in a same vertical direction, the first receiving coil and the second receiving coil are at least partially perpendicular to each other. When the stylus performs the touch operation on the protective layer 356, the electromagnetic coils generate different electric fields or magnetic fields to the stylus, so as to implement touch functionality.

Specifically, when setting the first receiving coils and the second receiving coils, a number of turns of the electromagnetic coils corresponding to the first receiving coils and a number of turns of the electromagnetic coils corresponding to the second receiving coils may be same. Alternatively, the two kinds of the receiving coils are designed with different numbers of turns according to needs, which will not be repeated here.

Figure 2A:
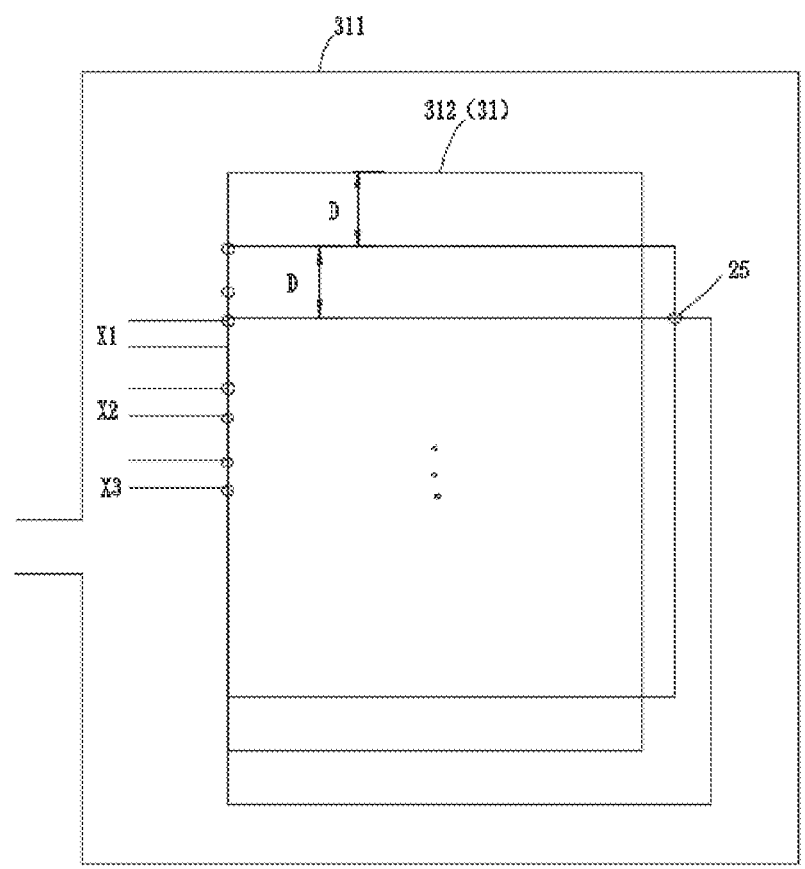
FIG. 2A is a schematic structural diagram of an arrangement of coils provided in the embodiment of the present disclosure.

Specifically, as shown in FIG. 2A, FIG. 2A is a schematic structural diagram of an arrangement of the electromagnetic coils provided by the embodiment of the present disclosure.

Specifically, when the receiving coils provided in the embodiment of the present disclosure are arranged, the first receiving coils 312 may be provided with multiply turns.

projections of the first receiving coils 312 on the base 101 may be at least partially overlapped, and via holes 25 are provided at overlapped portions to prevent adjacent coils from being short-circuited through the via holes 25. The first receiving coils 312 may be arranged inside the transmitting coils 311, for example, a first transmitting coil 311 is arranged around the first receiving coils 312.

At the same time, the number of turns of the transmitting coils 311 is less than the number of turns of the first receiving coils 312. In the following embodiments, the transmitting coil 311 is provided with one turn, and the first receiving coils 312 are provided with multiply turns, such as three turns. In addition, the number of turns of the transmitting coils 311 and the number of turns of the first receiving coils 312 may be set according to a specific size of the product, which will not be described in detail here.

The transmitting coils 311 and the first receiving coils 312 can be arranged as rectangular coils or other shapes of coils. At the same time, the electromagnetic touch screen further includes a control chip. The transmitting coils 311 and the first receiving coils 312 are all connected to the control chip. For example, the beginning portions and the end portions of the first receiving coils 312 are respectively and electrically connected to different terminals of the control chip to form closed circuits with the control chip. Specifically, for each turn of the first receiving coils 312, the both ends of each turn of the coils are connected to the control chip, so that a driving signal is provided through the control chip to a corresponding coil. Preferably, when setting the second receiving coils, the second receiving coils are also correspondingly connected to a control chip. In the embodiment of the present disclosure, the control chip connected with the first receiving coils and the control chip connected with the second receiving coil may be a same control chip, or different control chips according to product requirements.

In addition, in the embodiment of the present disclosure, the transmitting coils 311 may be arranged at intervals, and the first receiving coils 312 may also be arranged at intervals, as shown in FIG. 2A.

Figure 2B:
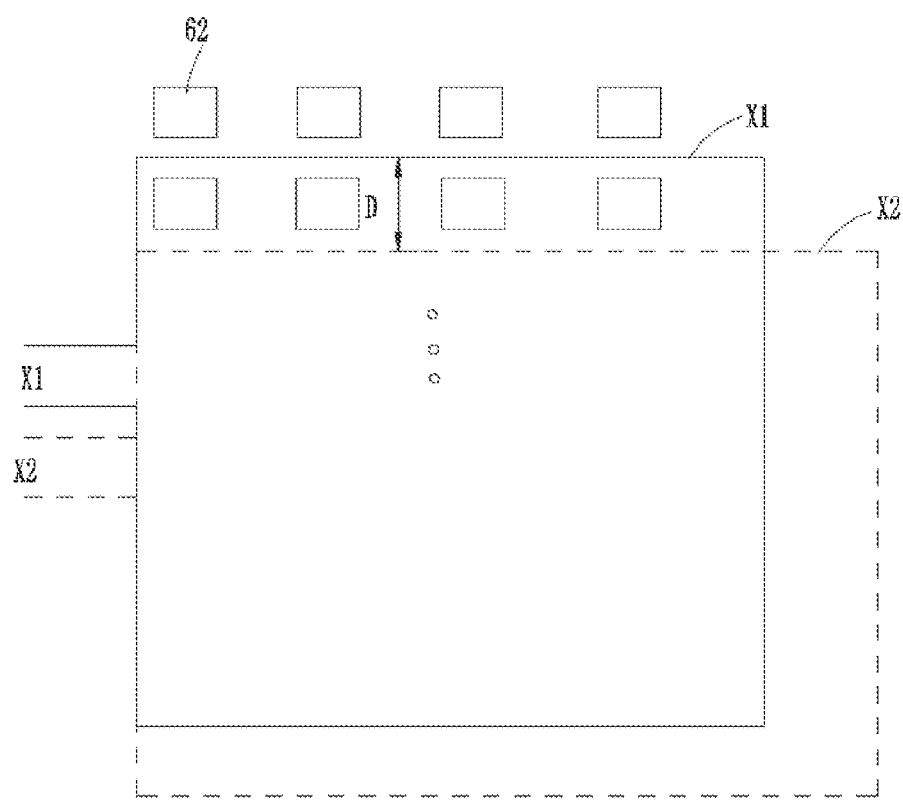
FIG. 2B is a schematic diagram of an arrangement of two adjacent coils in FIG. 2A provided in the embodiment of the present disclosure.

As shown in FIG. 2B, FIG. 2B a schematic diagram of an arrangement of two adjacent coils in FIG. 2A. The two adjacent turns of the first receiving coil 312 are taken as an example, and the other first receiving coils are arranged sequentially according to the arrangement of the above two turns of coils, which will not repeat here.

Specifically, that the two turns of the first receiving coils 312 include a coil X1 and a coil X2 is taken as an example. A plurality of light-emitting units 62 arranged in an array are provided in the electromagnetic touch screen. Only a first row and a second row of the light-emitting units 62 in the electromagnetic touch screen are shown in FIG. 2B. The first receiving coils 312 are correspondingly arranged at blank positions between adjacent rows of the light-emitting unit 62 in the electromagnetic touch screen, such as in gap areas between the adjacent rows of the light-emitting units 62, thereby reducing influence of the coils on light of the light-emitting units 62.

In the embodiment of the present disclosure, a distance between the coil X1 and the coil X2 ranges from 1 mm to 10 mm. For example, an upper part of the coil X1 is arranged between the first row of light-emitting units 62 and the second row of the light-emitting units 62 in the electromagnetic touch screen, at the same time, a lower part of the coil X1 is correspondingly arranged in a gap area between a third row of the light-emitting units 62 and a fourth row of the light-emitting units 62 of the electromagnetic touch screen, a left part of the coil X1 is disposed at a left edge of the electromagnetic touch screen, and a right part of the coil X1 is disposed at a right edge of the electromagnetic touch screen, so as to form a complete coil X1. When setting up the coil X2, an upper part of the coil X2 is arranged in a gap area between the second row of light-emitting units 62 and the third row of the light-emitting units 62, at the same time, a lower part of the coil X2 is arranged in a gap area between the fourth row of the light-emitting units 62 and a fifth row of the light-emitting units 62, a left part of the coil X2 is disposed at the left edge of the electromagnetic touch screen, and a right part of the coil X2 is disposed at the right edge of the electromagnetic touch screen. So that the first receiving coils 312 corresponding to the coil X1 and the coil X2 are eventually formed. At this time, each of the coil X1 and the coil X2 surrounds two rows of light-emitting units 62. Other coils adjacent to each other are arranged according to the preceding routing rule.

The multiply turns of the transmitting coils 311 may be arranged at equal intervals, and the multiply turns of the second receiving coils 313 may be also arranged at equal intervals, and an arrangement of the second receiving coils 313 is in accordance with column directions of the light-emitting units 62. When the second receiving coils 313 are arranged in accordance with column directions of the light-emitting units 62, a routing rule is same as the routing rule of the first receiving coils 312 in accordance with row directions of the light-emitting units 62, which will not be repeated here.

Preferably, a distance between two adjacent first receiving coils 312 can be set to D2. At the same time, two adjacent first receiving coils 312 can also be arranged at equal intervals, such as the distance between two adjacent first receiving coils 312 is set to D. The above-mentioned distance D and distance D2 can be set according to the requirements of actual products. In the embodiment of the present disclosure, the distance between the two adjacent first receiving coils 312 may be defined as a distance between the upper parts corresponding to the two adjacent first receiving coils 312, or be defined as a distance between input ends of the two adjacent first receiving coils 312. Referring to FIG. 2B for details, the distance D between the coil X1 and the coil X2 is defined as the distance between the upper part of the coil X1 and the upper part of the coil X2. Similarly, the distance between two adjacent transmitting coils is defined as a distance between the left parts of the two adjacent transmitting coils. The distance D2 shown in FIG. 1A is for detail.

In the embodiment of the present disclosure, the distance between two adjacent turns of the above-mentioned transmitting coils 311 is set to range from 1 mm to 10 mm. The distance D between two adjacent turns of the above-mentioned first receiving coils 312 is set to range from 1 mm to 10 mm. Preferably, the distance between the two adjacent turns of the transmitting coils 311 may be set to 3 mm, and at the same time, the distance between the two adjacent turns of the first receiving coils 312 may be set to 5 mm. Optionally, the above-mentioned different distances may be adjusted according to the needs of specific products. It is also possible to make the distance D same as the distance D2. In the embodiment of the present disclosure, the multiply turns of the coils are arranged at equal intervals, so as to ensure that electromagnetic fields between adjacent coils are provided with a consistent effect, thereby ensuring effects of the electromagnetic coils in a same sensing layer on the stylus, and improving the effects on the stylus.

Preferably, when the above-mentioned transmitting coils 311 and the first receiving coils 312 are arranged, a width of the transmitting coil 311 is greater than a width of the corresponding first receiving coil 312. For example, the transmitting coil 311 is provided with a wire diameter greater than a wire diameter of the first receiving coil 312. When the transmitting coils 311 are fed with a current, due to the width of the transmitting coil 311 greater than the width of the first receiving coil 312, therefore, the electric field or the magnetic field generated by the transmitting coil 311 is greater than the electric field or the magnetic field generated by the corresponding first receiving coils 312. Therefore, it is ensured that the transmitting coils 311 are provided with relatively large transmitting powers, and the effects on the stylus are improved. At the same time, in the embodiment of the present disclosure, when setting the above-mentioned first receiving coils 312 and transmitting coils 311, the first receiving coils 312 and the transmitting coils 311 may be arranged in a same layer, thus effectively ensuring the consistency of the effects of different electromagnetic coils on the stylus.

Specifically, a ratio of the width of the transmitting coil 311 to the width of the first receiving coil may range from 5 to 20. Preferably, the width of the first transmitting coil 311 is set to 5 mm, the width of the corresponding first receiving coil is set to 1 mm, at this time, the ratio of the width of the transmitting coil 311 to the width of the first receiving coil is 5. In this way, the transmitting coil can have a larger transmitting power, and can have a better power ratio with the first receiving coil, so as to ensure the coordination between the electromagnetic touch screen and the stylus. Optionally, the width of each of electromagnetic coils mentioned above is set according to the size of the actual product, which will not be repeated here.

Figure 2C:
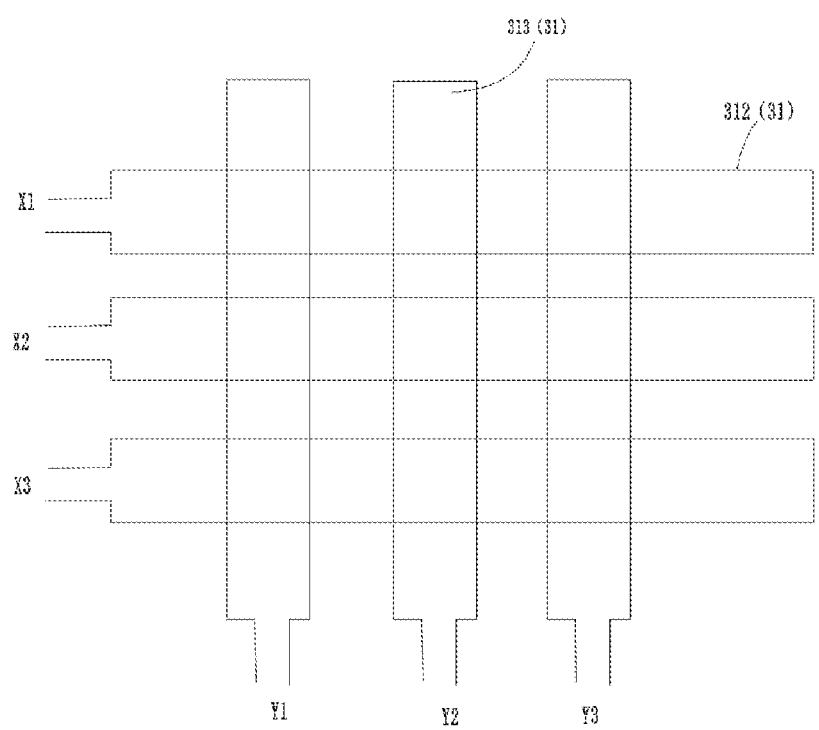
FIG. 2C is a schematic structural diagram of another arrangement of the coils provided in the embodiment of the present disclosure.

In addition, in the embodiment of the present disclosure, when setting the above-mentioned electromagnetic coils, each of the electromagnetic coils may be bent according to the setting of the product, such as in the row directions of the base 101, the first receiving coils and the transmitting coils are bent to form a plurality of Chinese characters " " or " ". Specifically, they are as shown in the schematic diagram of the electromagnetic coils in FIG. 2C. In the embodiment of the present disclosure, in the directions corresponding to X and Y, the receiving coils are arranged at equal intervals. For example, the first receiving coils 312 include a coil X1, a coil X2, and a coil X3, the second receiving coils 313 include a coil Y1, a coil Y2, and a coil Y3. By arranging the coils in parallel and at equal intervals in corresponding directions, a number of turns of the coils is further increased, thereby improving an induction effect of the coils. Preferably, the coils may be set to "n" turns, such as a coil Xn and a coil Yn are arranged respectively according to a routing rule of the coil X1, the coil X2, and a routing rule of the coil X3, and the coil Y1, the coil Y2, and the coil Y3. The transmitting coils are arranged around the periphery of the receiving coils. When setting the above-mentioned coils, adjacent coils may be non-overlapped or partially overlapped according to requirements.

Figure 3:
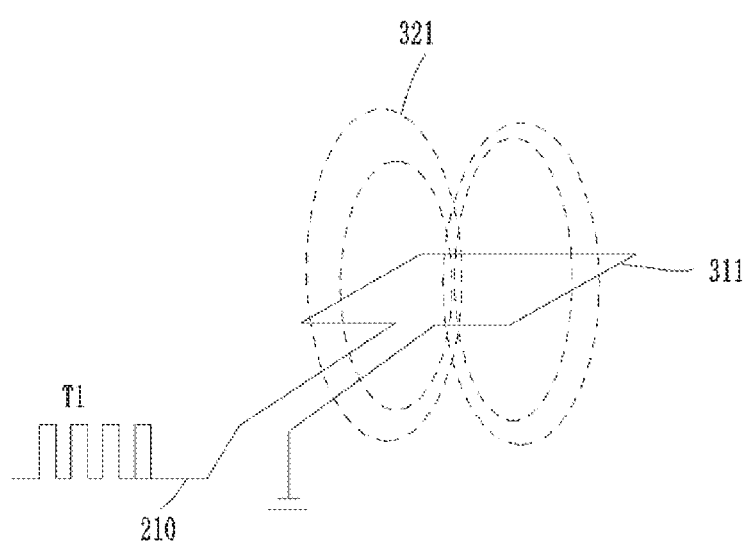
FIG. 3 is a schematic diagram showing a working principle of a transmitting coil provided in the embodiment of the present disclosure.
Figure 4:
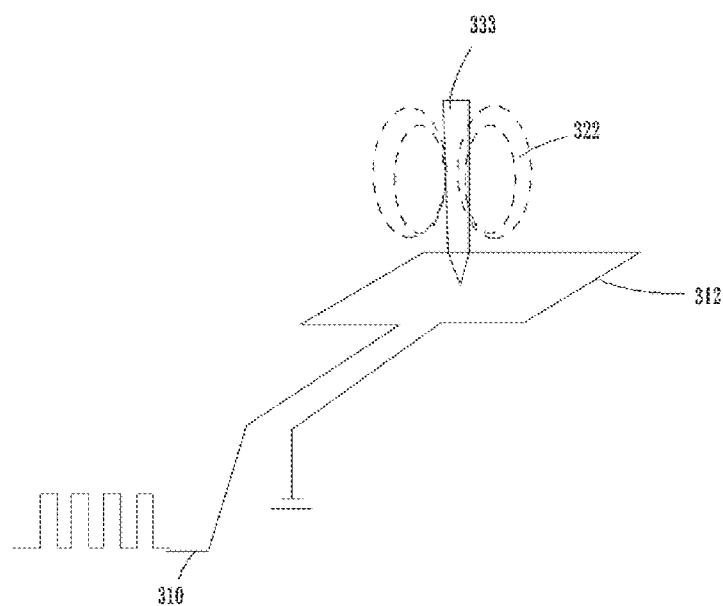
FIG. 4 is a schematic diagram showing a working principle of a first receiving coil provided in the embodiment of the present disclosure.

In addition, as shown in FIG. 3 and FIG. 4, FIG. 3 a schematic diagram showing a working principle of the transmitting coil provided by the embodiment of the present disclosure, and FIG. 4 is a schematic diagram showing a working principle of the first receiving coil provided by the embodiment of the present disclosure. In the embodiment of the present disclosure, the electromagnetic coils are provided to set up, and drive signals are provided to the transmitting coils and the first receiving coils respectively through the control chip. In the embodiment of the present disclosure, the transmitting coils and the first receiving coils do not work simultaneously.

Specifically, the control chip firstly provides drive signals from first input ends 210 to the transmitting coils 311, such as input drive currents to the transmitting coils. In the embodiment of the present disclosure, the drive signals may be sequential drive signals or periodic drive signals.

When the transmitting coil 311 receives the drive signal T1, a first magnetic field 321 is induced and generated in the transmitting coil 311, as the first magnetic field shown by a dotted circular in FIG. 3. At this time, the transmitting coil 311 is equivalent to a power generator. At this time, the stylus is charged under an action of the first magnetic field 321. In the embodiment of the present disclosure, during a process of transmitting the signal from the transmitting coil 311, the stylus is charged at any position in an area where the electromagnetic touch screen is located. Preferably, when the stylus is located at a center of the electromagnetic touch screen, a transmitting power of the transmitting coil 311 is ensured to meet a charging power of the stylus, thus, a charging effect of the transmitting coil on the stylus is ensured.

Referring to FIG. 4 for details, after the stylus 333 is charged under the action of the transmitting coil, the stylus 333 is configured to touch the electromagnetic touch screen and discharge. At this time, a second magnetic field 322 is generated in the stylus, as shown by a dotted coil in FIG. 4. Since the first receiving coils 312 are arranged in the electromagnetic touch screen, at this time, each of the first receiving coils 312 and the second receiving coils 313 generates an induced electric field under an action of the second magnetic field 322, and receiving signals are accordingly generated in the first receiving coils 312. The receiving signals are applied to the control chip from output ends 310 of the first receive coils 312, and then a touch point of the stylus is obtained according to the receiving signals, and a touch operation of the electromagnetic touch screen is achieved.

In the embodiment of the present disclosure, when the electromagnetic touch screen is working, it may include a transmitting stage and a receiving identifying stage. During time diagrams corresponding to the transmitting stage and the receiving identifying stage, the control chip is configured to provide the sequential drive signals or the periodic drive signals to the transmitting coils, and the transmitting coils are configured to generate the first magnetic fields and transmit the transmitting signals, and the stages are mainly configured to charge the stylus.

During a time diagram corresponding to the receiving identifying stage, the stylus discharges and generates a second magnetic field, the receiving coils are scanned line by line, and the receiving coils generate receiving signals in the second magnetic field, and the control chip is configured to determine the touch point according to the receiving signals of the receiving coils and complete the touch operation.

Figure 5:
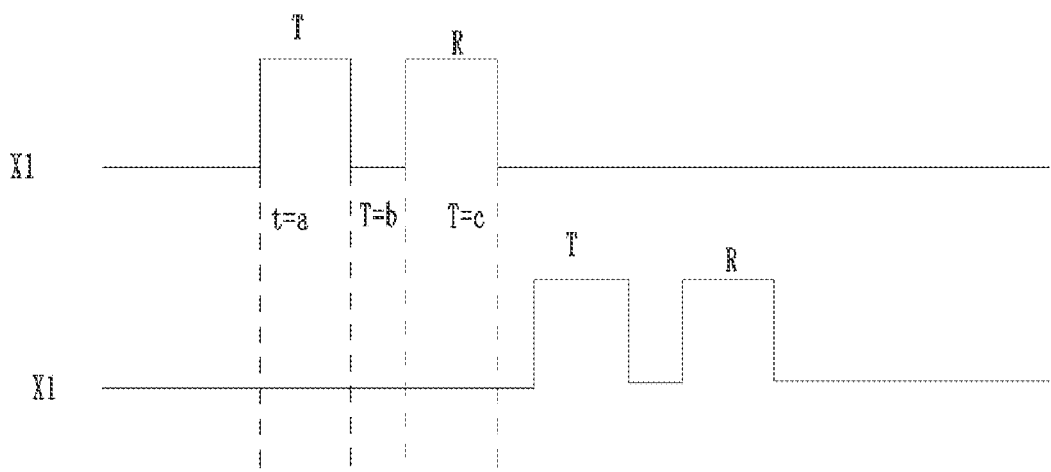
FIG. 5 is a timing diagram corresponding to an electromagnetic drive in an electromagnetic touch screen in prior art.
Figure 6:
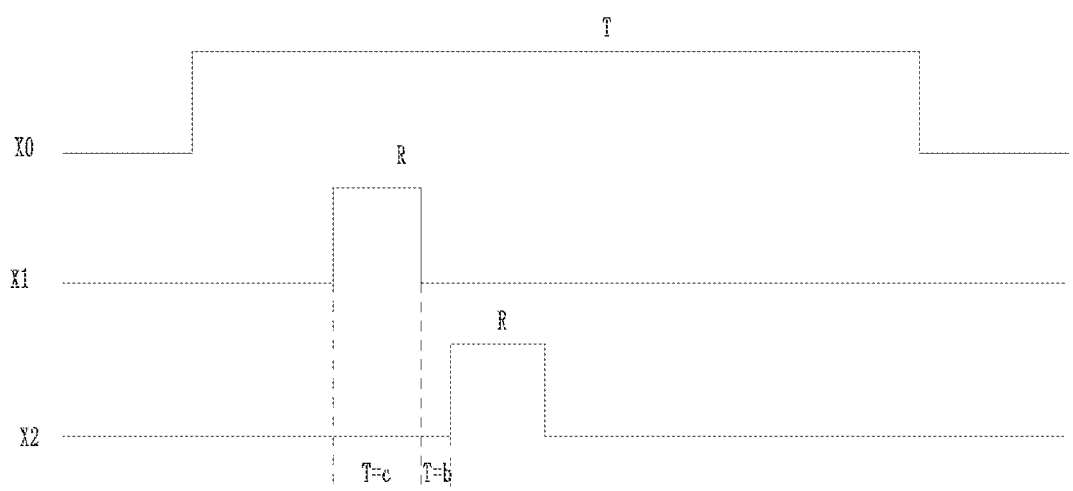
FIG. 6 and FIG. 7 are timing diagrams corresponding to electromagnetic drives in the coils provided in the embodiment of the present disclosure.
Figure 7:
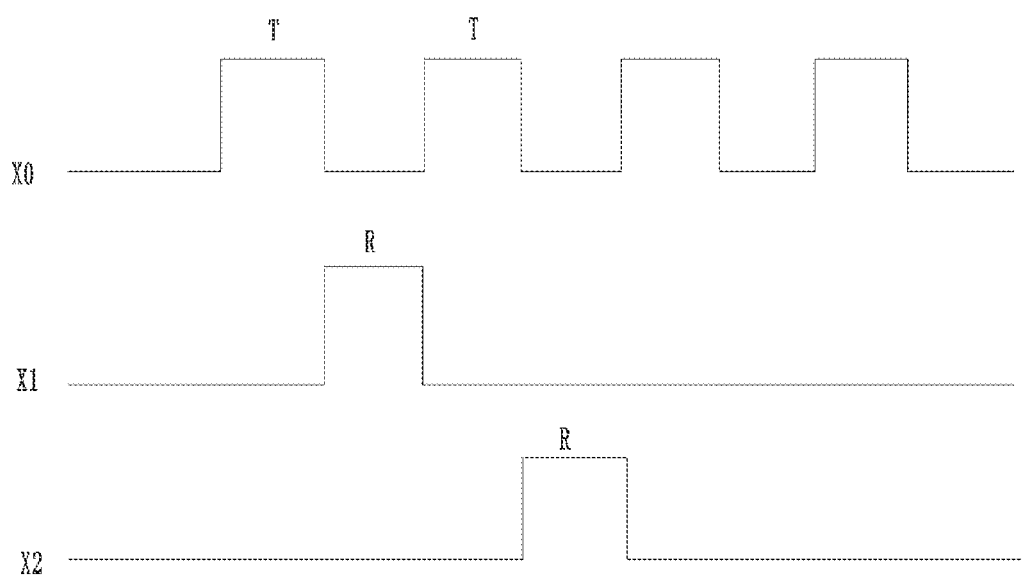

In addition, as shown in FIG. 5, FIG. 6, and FIG. 7, FIG. 5 is a timing diagram corresponding to an electromagnetic drive in an electromagnetic touch screen in the prior art; FIG. 6 and FIG. 7 are timing diagrams corresponding to electromagnetic drives in the coils provided in the embodiment of the present disclosure. Among them, FIG. 6 shows that the transmitting coils are provided with sequential drive signals, and FIG. 7 shows that the transmitting coil is provided with periodic drive signals.

Specifically, according to the electromagnetic coils in prior art, each of coils transmits a transmit signal and further generate a receiving signal during an entire touch process. For example, according to the coil X1 and the coil X2, during the touch process, within a time period t=a, the coil X1 firstly transmits the transmitting signal through which the stylus is charged, and during a time period t=c, the coil X1 further generates the receiving signal, so as to implement the control of the touch screen.

In the embodiment of the present disclosure, referring to FIG. 6 for details, the electromagnetic coils in the embodiment of the present disclosure include a transmitting coil X0, the first receiving coil X1, the first receiving coil X2. At this time, when performing a touch operation, the transmitting coil X0 firstly transmits the transmitting signal through which the stylus is charged, the first receiving coil X1 and the first receiving coil X2 accordingly generate corresponding receiving signals, and thereby achieving operation of the touch screen and positioning the touch point.

Therefore, in the embodiment of the present disclosure, the transmitting signal and the receiving signals are carried through different electromagnetic coils, thus effectively improving the touch effect of the stylus on the electromagnetic touch screen, and effectively improving the touch reporting accuracy.

Combined with FIG. 5 to FIG. 7, according to a control operation of the passive electromagnetic stylus in the prior art, when driving the electromagnetic coils in the touch screen, each drive needs to give the transmitting signal and the receiving signal in a same coil. Assuming that the electromagnetic coils are provided with "N" channels, each transmitting requires a time t=a, each reception requires a time t t=c, and a channel switching requires a time t=b, thus one positioning requires a total time T=(a+c+2b)*2*N.

Referring to FIG. 6, in the embodiment of the present disclosure, when the transmitting coils are provided with full-time drive signals, a corresponding one positioning time T1=(c+b)*2*N. At this time, when the panel is touched, the transmitting coils continuously transmit the transmitting signals during a touch timing diagram, and the corresponding receiving coils generate receiving signals at periodic intervals during the touch timing diagram.

Referring to FIG. 7, in the embodiment of the present disclosure, when the transmitting coils are provided with periodic alternating drive signals, a corresponding one positioning time T2=(c+a)*2*N. At this time, when the panel is touched, the transmitting coil X0 periodically transmits the transmitting signals during the touch timing diagram, and at the same time, the receiving coil X1 and the receiving coil X2 generate the receiving signals only during a non-touch timing diagram, which effectively shortens the working time.

Therefore, in the embodiment of the present disclosure, the positioning time is shortened compared with the positioning time of the touch screen in prior art, so that touch sensitivity and touch effect of the touch screen are better.

The electromagnetic touch screen further includes a light-emitting component layer, specifically, the light-emitting component layer is arrayed with a plurality of light-emitting units. Combined with the arrangement structure in FIG. 2B, in the embodiment of the present disclosure, the light-emitting component layer may be disposed on the base, and at the same time, the light-emitting component layer covers the coils.

Figure 8:
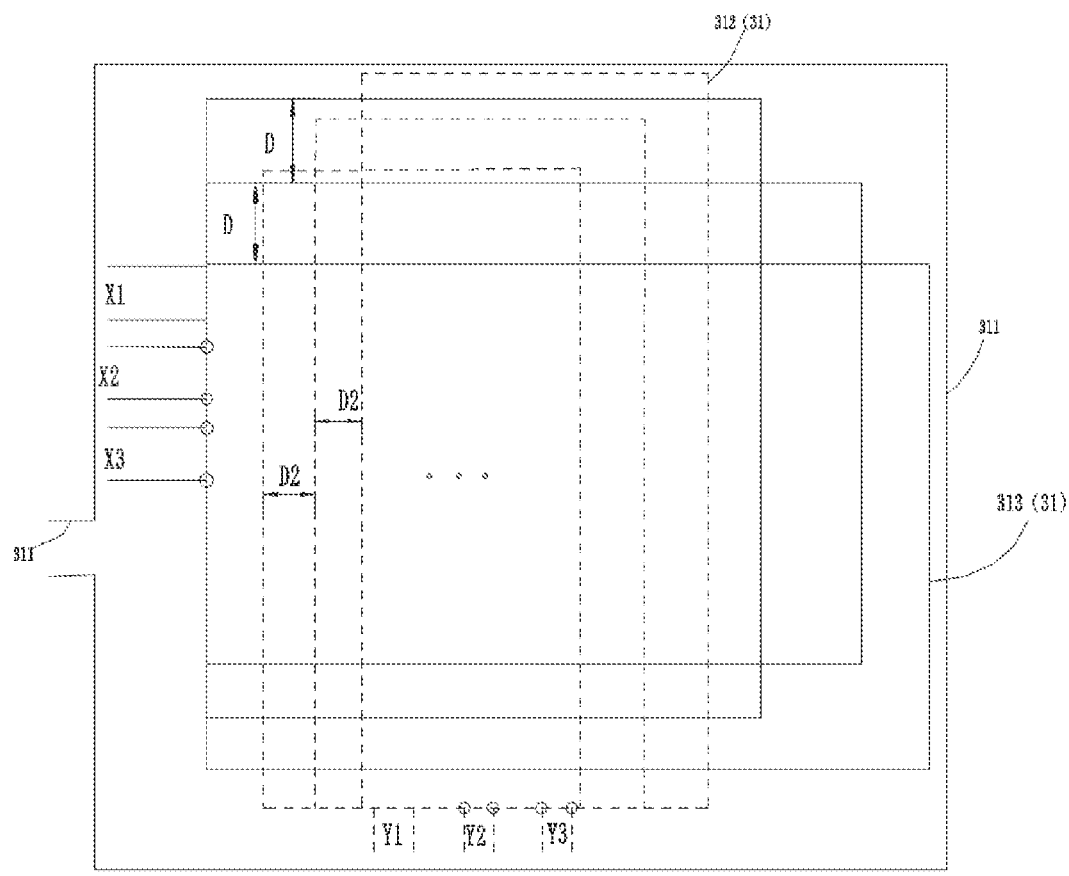
FIG. 8 is a schematic plane structural view of an electromagnetic touch device provided in an embodiment of the present disclosure.

In addition, as shown in FIG. 8, FIG. 8 is a schematic plane structural view of an electromagnetic touch device provided in the embodiment of the present disclosure. Referring to FIG. 8 for details, the touch device includes transmitting coils 311 and receiving coils 31. The receiving coils 31 include first receiving coils 312 arranged in a X direction and second receiving coils 313 arranged in a Y direction. At the same time, transmitting coils 311 are arranged around the receiving coils. Specifically, there are multiple turns of the first receiving coils 312 and the second receiving coils 313 arranged within each of the transmitting coils 311. The above coils are only examples, the transmitting coils 311 and the first receiving coils 312 are arranged according to the structure in the above embodiment, and which will not be repeated here.

In the embodiment of the present disclosure, at least one light-emitting unit is provided within each of the electromagnetic coils, that is, each of the electromagnetic coils surrounds a plurality of light-emitting units, and a light-emitting device can be arranged in the corresponding light-emitting unit, thus achieving touch operations in different areas.

In the embodiment of the present disclosure, when setting the transmitting coils 311 and the receiving coils 31, they can be laid along different rows and columns, and at least two rows or two columns of the light-emitting units may be arranged within each turn of the transmitting coils 311 and the receiving coils 31. Specifically, when laying, corresponding input ends or corresponding output ends of the transmitting coils are arranged at different positions of the device, and an annular loop structure provided in the embodiment of the present disclosure is formed.

Figure 9:
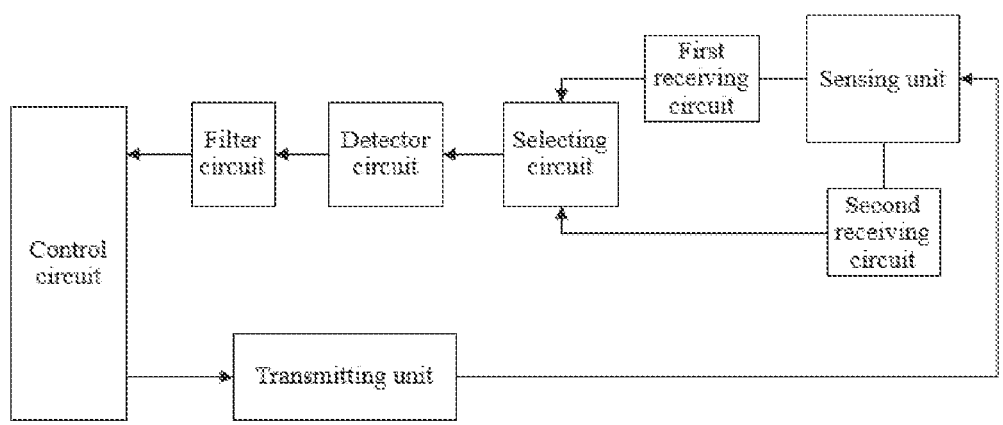
FIG. 9 is a schematic structural diagram of the electromagnetic touch device provided in the embodiment of the present disclosure.

In addition, as shown in FIG. 9, FIG. 9 is a schematic structural diagram of the electromagnetic touch device provided by the embodiment of the present disclosure. In the embodiment of the present disclosure, the electromagnetic touch device includes the electromagnetic touch screen and a corresponding stylus. Better performance of the touch effect is achieved through coupling of the electromagnetic touch screen and the stylus.

Specifically, the electromagnetic touch device further includes a control unit, a transmitting unit, a sensing unit, and a receiving unit.

Specifically, the control unit includes a detection circuit, a filter circuit, a selection circuit, and a control circuit. The receiving unit includes receiving circuits. Among them, the control circuit is electrically connected with the transmitting unit, and the control circuit is configured to transmit control signals (those are drive signals) to the transmitting unit; the transmitting unit is electrically connected with the sensing unit, and the transmitting unit is configured to transmit the control signals to the sensing unit; the sensing unit is electrically connected with the receiving circuits, and the receiving circuits are configured to receive inductive signals (those are the receiving signals) from the receiving coils of the sensing unit; the selection circuit is electrically connected with the receiving circuit, and the selection circuit is configured to receive the inductive signals transmitted by the receiving circuits; the detection circuit is connected with the selection circuit, and the detection circuit is configured to detect the inductive signals transmitted by the selection circuit; and the filter circuit is connected with the detection circuit, and the filter circuit is configured to filter the inductive signals after detected and obtain available inductive signals. At the same time, the control circuit is connected with the filter circuit, and the control circuit is configured to receive the available inductive signals and obtain the positions of the stylus according to the available inductive signals.

In the embodiment of the present disclosure, the control unit is configured to transmit and receive control signals, provide the transmitting signals to the transmit coils according to the touch signal, and provide the receiving signals to the receiving coils. The transmitting unit is configured to receive the control signals transmitted by the control circuit in the control unit. At the same time, the sensing unit is equipped with the transmitting coils and the receiving coils, and the coils are configured to receive the control signals transmitted by the transmitting unit. When the stylus touches, the transmitting coils are configured to transmit the transmitting signals to generate the first magnetic field. The first magnetic field is configured to charge the stylus. At the same time, the receiving coils generate the receiving signals according to the stylus.

In the embodiment of the present disclosure, the sensing unit may be an electromagnetic touch screen, and the sensing unit is correspondingly equipped with the transmitter coils, the first receiving coils, and the second receiving coils. Among them, each coil is designed according to the structure in the embodiment of the present disclosure, and which will not be repeated here.

In addition, the receiving unit in the embodiment of the present disclosure is configured to receive the inductive signals of the sensing unit and transmit the inductive signals to the control unit. The receiving unit may include a first receiving circuit and a second receiving circuit. The first receiving circuit is correspondingly and electrically connected to the first receiving coils, and the second receiving circuit is correspondingly and electrically connected to the second receiving coils.

Figure 10:
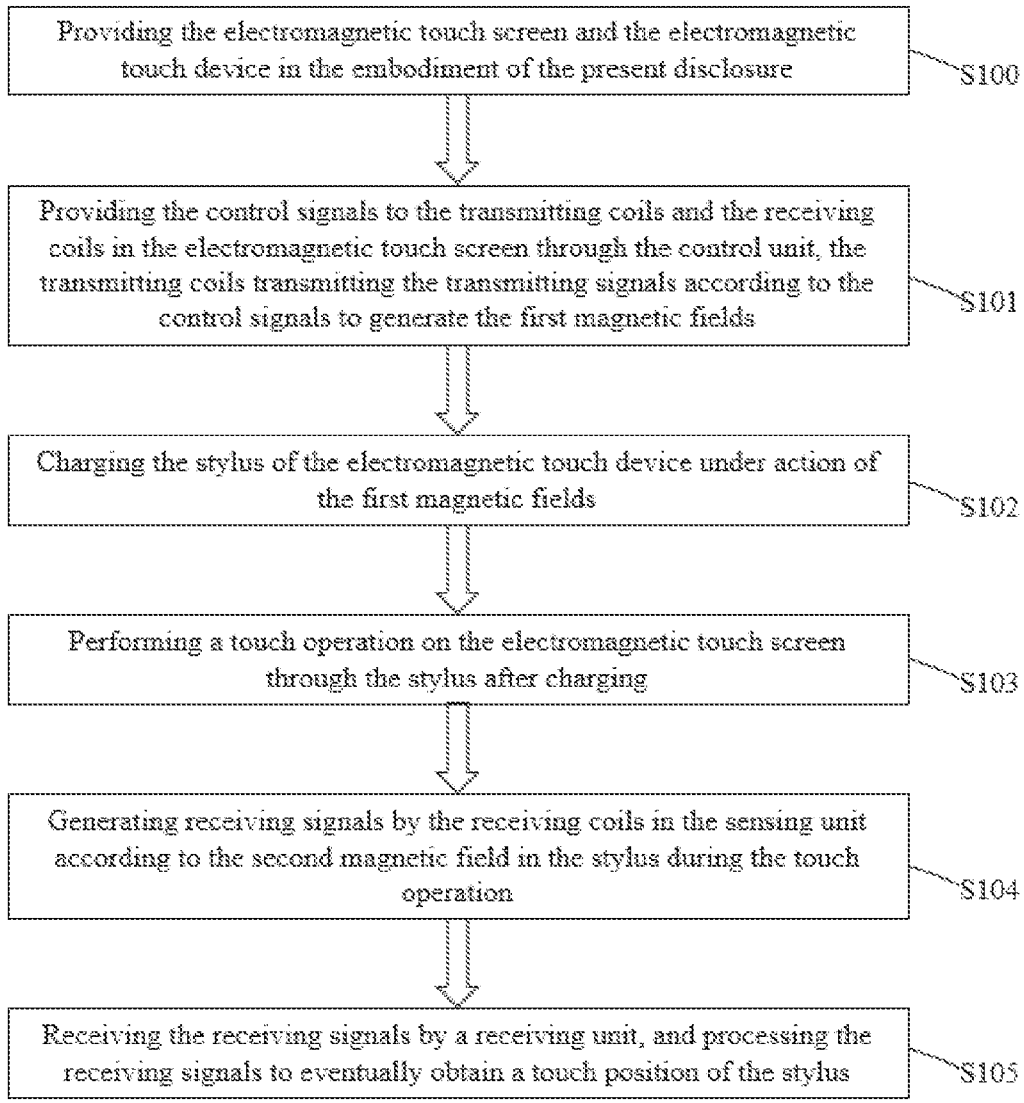
FIG. 10 is a diagram showing a touch point sensing method provided in an embodiment of the present disclosure.

Referring to FIG. 10 for details, FIG. 10 is a diagram showing a touch point sensing method provided in the embodiment of the present disclosure. When the electromagnetic touch device is touched, the following steps are included:

S100: Providing the electromagnetic touch screen and the electromagnetic touch device in the embodiment of the present disclosure;

S101: Providing the control signals to the transmitting coils and the receiving coils in the electromagnetic touch screen through the control unit, the transmitting coils transmitting the transmitting signals according to the control signals to generate the first magnetic fields;

S102: Charging the stylus of the electromagnetic touch device under action of the first magnetic fields;

S103: Performing a touch operation on the electromagnetic touch screen through the stylus after charging;

S104: Generating receiving signals by the receiving coils in the sensing unit according to the second magnetic field in the stylus during the touch operation; and S105: Receiving the receiving signals by a receiving unit, and processing the receiving signals to eventually obtain a touch position of the stylus.

Specifically, in combination with the timing diagrams in FIG. 6 and FIG. 7, when performing the touch operation, the control chip firstly transmits the drive signals to the electromagnetic coils, so that the transmitting coils correspondingly transmit transmitting signals through which the stylus is charged.

After charging, the electromagnetic touch screen is touched by the stylus. During the touch operation, the first receiving coils and the second receiving coils generate receiving signals according to the second magnetic field in the stylus, and the receiving unit receives the receiving signals and processes the receiving signals.

In the embodiment of the present disclosure, the control chip provides drive signals to the electromagnetic coils periodically or continuously, so that the transmitting coils correspondingly transmit transmitting signals. During the touch operation, the receiving coils generate corresponding electrical signals according to the second magnetic field in the stylus, so as to generate the receiving signals according to the electrical signals. The receiving signals are processed again, and finally a touch point position of the stylus is obtained. In addition, when various driving voltages are applied to the above-mentioned first receiving coils, the voltage values of the drive voltages applied to the first receiving coil may be same. Optionally, different drive voltages may be applied to different first receiving coils, such as the drive voltages of a part of the first receiving coils are greater than the drive voltages of a remaining part of the first receiving coils. Multiple different receiving coils can be scanned, so that different driving voltages can be applied to different first receiving coils to adjust the touch performance of the stylus and the touch screen, and ensure the touch effect and touch reporting accuracy.

In the embodiment of the present disclosure, the transmitting signals and receiving signals in the circuits are respectively generated by different electromagnetic coils, so it effectively relieves the problem that the transmitting signal and receiving signal in prior art are generated by a same electromagnetic coil, so as to improve the touch reporting accuracy, and effectively reduce a sensing time, thereby effectively improving the touch performance and comprehensive performance of the electromagnetic touch device.

The electromagnetic touch device may be a cell phone, a computer, an electronic paper, a monitor, a notebook computer, a digital photo frame, and any other product or component with display function and touch function. The specific type is not specifically limited.

In summary, the electromagnetic touch screen and the touch device provided in the embodiment of the present disclosure are introduced in detail. Specific examples have been used to illustrate the principle and implementation of the present disclosure. The illustration of the above embodiment is intended only to assist in understanding the technical solutions and core ideas of the present disclosure. Although the present disclosure is disclosed above with the preferred embodiment, the above-mentioned preferred embodiment is not intended to limit the present disclosure. Those skilled in the art can make various changes and modifications without departing from the spirit and scope of the present disclosure. Therefore, the scope of protection of the present disclosure is based on the scope defined by the claims.

What is claimed is:

1. An electromagnetic touch screen, coupled with a stylus, and comprising:
    a base;
    transmitting coils arranged on the base; and
    receiving coils arranged on the base;
    wherein all of the transmitting coils are correspondingly arranged in a peripheral area around the receiving coils, the transmitting coils are configured to transmit transmitting signals through which a first magnetic field is generated to charge the stylus before a touch operation, and the receiving coils are configured to generate receiving signals during the touch operation.

2. The electromagnetic touch screen of claim 1, wherein the electromagnetic touch screen comprises a display area and a non-display area disposed on at least one side of the display area;
    wherein the transmitting coils and the receiving coils are at least correspondingly disposed in the display area; and
    wherein a number of turns of the transmitting coils is less than a number of turns of the receiving coils.

3. The electromagnetic touch screen of claim 2, wherein the number of the turns of the transmitting coils is greater than or equal to 1 and less than 4.

4. The electromagnetic touch screen of claim 2, wherein a distance between two adjacent turns of the transmitting coils ranges from 1 mm to 10 mm, and a distance between two adjacent turns of the receiving coils ranges from 1 mm to 10 mm.

5. The electromagnetic touch screen of claim 1, wherein a wire diameter of each of the transmitting coils is greater than a wire diameter of each of the receiving coils.

6. The electromagnetic touch screen of claim 5, wherein a ratio of the wire diameter of each of the transmitting coils to the wire diameter of each of the receiving coils ranges from 5 to 20.

7. The electromagnetic touch screen of claim 1, wherein the receiving coils comprise first receiving coils and second receiving coils;
    wherein the first receiving coils and the second receiving coils are disposed in different planes, and an orthographic projection of the first receiving coils on the base and an orthographic projection of the second receiving coils on the base are perpendicular to each other.

8. The electromagnetic touch screen of claim 7, the first receiving coils and the transmitting coils are disposed in a same layer.

9. The electromagnetic touch screen of claim 1, further comprising a control chip, wherein the control chip is disposed on the base, both ends of each of the transmitting coils are electrically connected to the control chip, and both ends of each of the receiving coils are electrically connected to the control chip; and the control chip is configured to provide drive signals to the transmitting coils and provide receiving control signals, so as to drive the transmitting coils to transmit the transmitting signals and drive the receiving coils to generate the receiving signals, wherein the electromagnetic touch screen comprises a transmitting stage and a receiving identifying stage;
    wherein during time diagrams corresponding to the transmitting stage and the receiving identifying stage, the control chip is configured to provide sequential drive signals or periodic drive signals to the transmitting coils, and the transmitting coils are configured to transmit the transmitting signals to generate the first magnetic field through which the stylus is charged; and
    wherein during a timing diagram corresponding to the receiving identifying stage, the stylus is configured to discharge and generate a second magnetic field, the receiving coils are configured to be scanned line by line and generate the receiving signals according to the second magnetic field, and the control chip is configured to determine a touch point of the stylus according to the receiving signals.

10. The electromagnetic touch screen of claim 1, further comprising:
    a control unit configured to transmit and receive control signals provided to the transmit coils and the receiving coils; and
    wherein the stylus is configured:
        to be inductively charged by the first magnetic field;

to perform a touch operation on the electromagnetic touch screen after being charged by the first magnetic field; and to generate a second magnetic field, wherein the electromagnetic touch screen is configured to obtain a touch position of the stylus by processing receiving signals of the receiving coils according to the second magnetic field generated by the stylus.

11. An electromagnetic touch device, comprising:

an electromagnetic touch screen comprising:
  transmitting coils configured to generate a first magnetic field;
  receiving coils;
  a control unit configured to transmit and receive control signals provided to the transmit coils and the receiving coils; and
  a stylus configured:
    to be inductively charged by the first magnetic field;
    to perform a touch operation on the electromagnetic touch screen after being charged by the first magnetic field; and
    to generate a second magnetic field,
  wherein the electromagnetic touch device is configured to obtain a touch position of the stylus by processing receiving signals of the receiving coils according to the second magnetic field generated by the stylus.

12. The electromagnetic touch device of claim 11, wherein all of the transmitting coils are correspondingly arranged in a peripheral area around the receiving coils.

13. The electromagnetic touch device of claim 11, further comprising a transmitting unit and a receiving unit;
  wherein the transmitting unit is connected with the control unit, configured to receive a drive signals from the control unit, and configured to transmit the drive signals to the electromagnetic touch screen;
  wherein the receiving unit is connected with the electromagnetic touch screen, configured to receive the receiving signals from the receiving coils, and configured to transmit the receiving signals to the control unit; and
  wherein the control unit is configured to determine the touch position of the stylus according to the receiving signals.

14. The electromagnetic touch device of claim 13, wherein the control unit further comprises:
  a selecting circuit, electrically connected to the receiving unit, and configured to receive the receiving signals transmitted by the receiving unit;
  a detector circuit, connected to the selecting circuit, and configured to detect the receiving signals transmitted by the selecting circuit;
  a filter circuit, connected to the detector circuit, and configured to filter the receiving signals after detection and generate available induction signals; and
  a control circuit, connected to the filter circuit, and configured to receive the available induction signals and obtain the touch point of the stylus according to the available sensing signals.

15. The electromagnetic touch device of claim 13, wherein the electromagnetic touch screen further comprises a base, the transmitting coils and the receiving coils arranged on the base, the receiving coils comprise first receiving coils and second receiving coils, the first receiving coils and the second receiving coils are disposed in different planes, and an orthographic projection of the first receiving coils on the base and an orthographic projection of the second receiving coils on the base are perpendicular to each other.

16. The electromagnetic touch device of claim 15, wherein the first receiving coils and the transmitting coils are disposed in a same layer.

17. The electromagnetic touch device of claim 15, wherein the receiving unit comprises a first receiving circuit and a second receiving circuit, the first receiving circuit is correspondingly and electrically connected to the first receiving coils, and the second receiving circuit is correspondingly and electrically connected to the second receiving coils.

18. The electromagnetic touch device of claim 11, wherein a number of turns of the transmitting coils is less than a number of turns of the receiving coils.

19. The electromagnetic touch device of claim 11, wherein a wire diameter of each of the transmitting coils is greater than a wire diameter of each of the receiving coils.

20. The electromagnetic touch device of claim 19, wherein a ratio of the wire diameter of each of the transmitting coils to the wire diameter of each of the receiving coils ranges from 5 to 20.

* * * * *